US007543148B1

(12) United States Patent
Kirovski et al.

(10) Patent No.: US 7,543,148 B1
(45) Date of Patent: Jun. 2, 2009

(54) AUDIO WATERMARKING WITH COVERT CHANNEL AND PERMUTATIONS

(75) Inventors: Darko Kirovski, Redmond, WA (US); Henrique Malvar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 09/614,890

(22) Filed: Jul. 12, 2000

Related U.S. Application Data

(60) Provisional application No. 60/143,432, filed on Jul. 13, 1999.

(51) Int. Cl.
*H04L 29/00* (2006.01)
(52) U.S. Cl. .................. 713/176; 380/238; 380/239
(58) Field of Classification Search .............. 382/100, 382/232; 713/176; 380/28, 201, 5, 23, 238, 380/239
See application file for complete search history.

(56) References Cited

U.S. PATENT DOCUMENTS

| | | | |
|---|---|---|---|
| 4,020,285 A | 4/1977 | Branscome et al. | |
| 4,433,211 A | 2/1984 | McCalmont et al. | |
| 4,980,887 A * | 12/1990 | Dively et al. ................. | 714/713 |
| 5,550,541 A | 8/1996 | Todd | |
| 5,646,997 A * | 7/1997 | Barton ....................... | 713/176 |
| 5,687,236 A | 11/1997 | Moskowitz et al. ............ | 380/28 |
| 5,745,604 A * | 4/1998 | Rhoads ....................... | 382/232 |
| 5,809,139 A * | 9/1998 | Girod et al. .................. | 380/202 |
| 5,822,360 A | 10/1998 | Lee et al. ..................... | 375/200 |
| 5,822,432 A | 10/1998 | Moskowitz et al. | |
| 5,852,469 A | 12/1998 | Nagai et al. | |
| 5,889,868 A | 3/1999 | Moskowitz et al. | |
| 5,905,800 A | 5/1999 | Moskowitz et al. | |
| 5,917,914 A | 6/1999 | Shaw et al. ................... | 380/42 |
| 5,930,369 A | 7/1999 | Cox et al. | |
| 5,933,798 A | 8/1999 | Linnartz ..................... | 702/191 |
| 5,970,140 A | 10/1999 | Sandford, II et al. | |
| 5,991,426 A | 11/1999 | Cox et al. | |
| 6,024,287 A | 2/2000 | Takai et al. | |
| 6,029,126 A | 2/2000 | Malvar | |
| 6,031,914 A * | 2/2000 | Tewfik et al. ................. | 380/54 |
| 6,061,793 A | 5/2000 | Tewfik et al. | |

(Continued)

FOREIGN PATENT DOCUMENTS

EP  0581317 A2  2/1994

(Continued)

OTHER PUBLICATIONS

Zhao et al., "A generic Digital Watermarking Model", Comput. & Graphics, vol. 22, No. 4, pp. 397-403, 1998.*

(Continued)

*Primary Examiner*—Carl Colin
(74) *Attorney, Agent, or Firm*—Lee & Hayes, PLLC

(57) ABSTRACT

Audio signals, such as a music clip, are inserted with detectable watermarks. The inserted watermark can identify the content producer and provide a signature embedded in the audio signal and cannot be removed. The watermark can survive all typical kinds of processing and malicious attacks. The watermark can be implemented in a watermarking system that employs a covert channel encoder to layer an additional information data message or covert message on top of the watermark. The watermarking system can also include a permutation technique to further hide the watermark and hide the covert message within the watermark.

12 Claims, 10 Drawing Sheets

U.S. PATENT DOCUMENTS

| | | | |
|---|---|---|---|
| 6,064,738 A | 5/2000 | Fridrich | |
| 6,064,764 A | 5/2000 | Bhaskaran et al. | |
| 6,088,325 A | 7/2000 | Giardina et al. | |
| 6,094,483 A | 7/2000 | Fridrich et al. | |
| 6,128,736 A * | 10/2000 | Miller | 713/176 |
| 6,131,162 A | 10/2000 | Yoshiura et al. | 713/176 |
| 6,192,139 B1 * | 2/2001 | Tao | 382/100 |
| 6,208,735 B1 | 3/2001 | Cox et al. | |
| 6,208,745 B1 * | 3/2001 | Florencio et al. | 382/100 |
| 6,209,094 B1 | 3/2001 | Levine et al. | |
| 6,219,634 B1 | 4/2001 | Levine | |
| 6,256,736 B1 | 7/2001 | Coppersmith et al. | |
| 6,259,801 B1 * | 7/2001 | Wakasu | 382/100 |
| 6,275,599 B1 | 8/2001 | Adler et al. | |
| 6,282,300 B1 | 8/2001 | Bloom et al. | |
| 6,330,672 B1 * | 12/2001 | Shur | 713/176 |
| 6,332,031 B1 | 12/2001 | Rhoads et al. | |
| 6,332,194 B1 | 12/2001 | Bloom et al. | |
| 6,334,187 B1 | 12/2001 | Kadono | |
| 6,345,100 B1 | 2/2002 | Levine | |
| 6,408,082 B1 | 6/2002 | Rhoads et al. | |
| 6,449,378 B1 * | 9/2002 | Yoshida et al. | 382/100 |
| 6,487,574 B1 | 11/2002 | Malvar | |
| 6,504,941 B2 * | 1/2003 | Wong | 382/100 |
| 6,523,113 B1 * | 2/2003 | Wehrenberg | 713/176 |
| 6,553,127 B1 | 4/2003 | Kurowski | |
| 6,585,341 B1 | 7/2003 | Walker et al. | |
| 6,608,867 B2 | 8/2003 | Zhong et al. | |
| 6,614,914 B1 * | 9/2003 | Rhoads et al. | 382/100 |
| 6,661,833 B1 | 12/2003 | Black et al. | |
| 6,700,989 B1 | 3/2004 | Itoh et al. | |
| 6,778,678 B1 * | 8/2004 | Podilchuk et al. | 382/100 |
| 6,807,634 B1 * | 10/2004 | Braudaway et al. | 713/176 |
| 6,842,871 B2 | 1/2005 | Piret et al. | |
| 6,952,774 B1 | 10/2005 | Kirovski et al. | |
| 6,961,444 B2 | 11/2005 | Levy | |
| 6,978,048 B1 | 12/2005 | Higginbottom et al. | |
| 6,983,057 B1 | 1/2006 | Ho et al. | |
| 7,031,491 B1 | 4/2006 | Donescu et al. | |
| 7,123,744 B2 | 10/2006 | Muratani et al. | |
| 7,142,691 B2 | 11/2006 | Levy | |
| 7,197,164 B2 | 3/2007 | Levy | |
| 2001/0000701 A1 * | 5/2001 | Carneheim et al. | 370/515 |
| 2002/0009208 A1 | 1/2002 | Alattar et al. | |
| 2002/0090109 A1 * | 7/2002 | Wendt | 382/100 |

FOREIGN PATENT DOCUMENTS

| | | |
|---|---|---|
| EP | 0899948 A1 | 3/1995 |
| EP | 0770498 A2 | 5/1997 |
| EP | 0 840 513 A2 | 5/1998 |
| EP | 0840513 A2 | 5/1998 |
| EP | 0 899 948 A1 | 3/1999 |
| EP | 0 913 952 A2 | 5/1999 |
| EP | 0913952 A2 | 5/1999 |
| EP | 1 017 049 A2 | 7/2000 |
| EP | 1017049 A2 | 7/2000 |
| JP | 11110913 | 4/1999 |
| WO | WO 98/03014 | 1/1998 |
| WO | WO98/03014 | 1/1998 |
| WO | WO 99/11020 | 3/1999 |
| WO | WO99/11020 | 3/1999 |

OTHER PUBLICATIONS

Mitchell D. Swanson, Bin Zhu, Ahmed H. Tewfik, Laurence Boney, Robust audio watermarking using perceptual masking. Signal Processing 66 (1998 Elsevier) 337-355.

Jian Zhao & Eckhard Koch. A Generic Digital Watermarking model. Comput& Graphics. vol. 22, No. 4, pp. 397-403, 1998 Elsevier Science Ltd.

Swanson et al., "Robust Audio Watermarking Using Perceptual Masking", Signal Processing 66, 1998, pp. 337-355.

Zhou et al., "A Generic Digital Watermarking Model", Comput. & Graphics, vol. 22, No. 4, 1998, pp. 397-403.

Mintzer, F; G. W. Braudaway. "If One Watermark is good, are more better?" Acoustics, Speech, and Signal Processing, 1999. Proceedings., 1999 IEEE International Conference on. Mar. 19, 1999, 2067-2069.

Fridrich, "Image Watermarking for Tamper Detection" 1998 citeseer. ist.psu.edu/fridrich98image.html 5 pages.

Kankanhalli et al., "Content Based Watermarking of Images" 1998 ACM Multimedia '98 p. 61-70.

Kirovski et al., "Robust Spread-Spectrum Audio Watermarking" 2001 IEEE p. 1345-1348.

Cookson, Christopher J., U.S. Appl. No. 60/116,641, filed Jan. 21, 1999, pp. 1-6.

Cox, et al., "Secure Spread Spectrum Watermarking for Multimedia", IEEE, 1997, IEEE Transactions on Image Processing, vol. 6, No. 12, Dec. 1997, pp. 1673-1687.

Johnson, et al., "Transform Permuted Watermarking for Copyright Protection of Digital Video", IEEE, 1998, pp. 684-689.

Tang, et al., "A DCT-Based Coding of Images In Watermarking", IEEE, 1997, pp. 510-512.

* cited by examiner

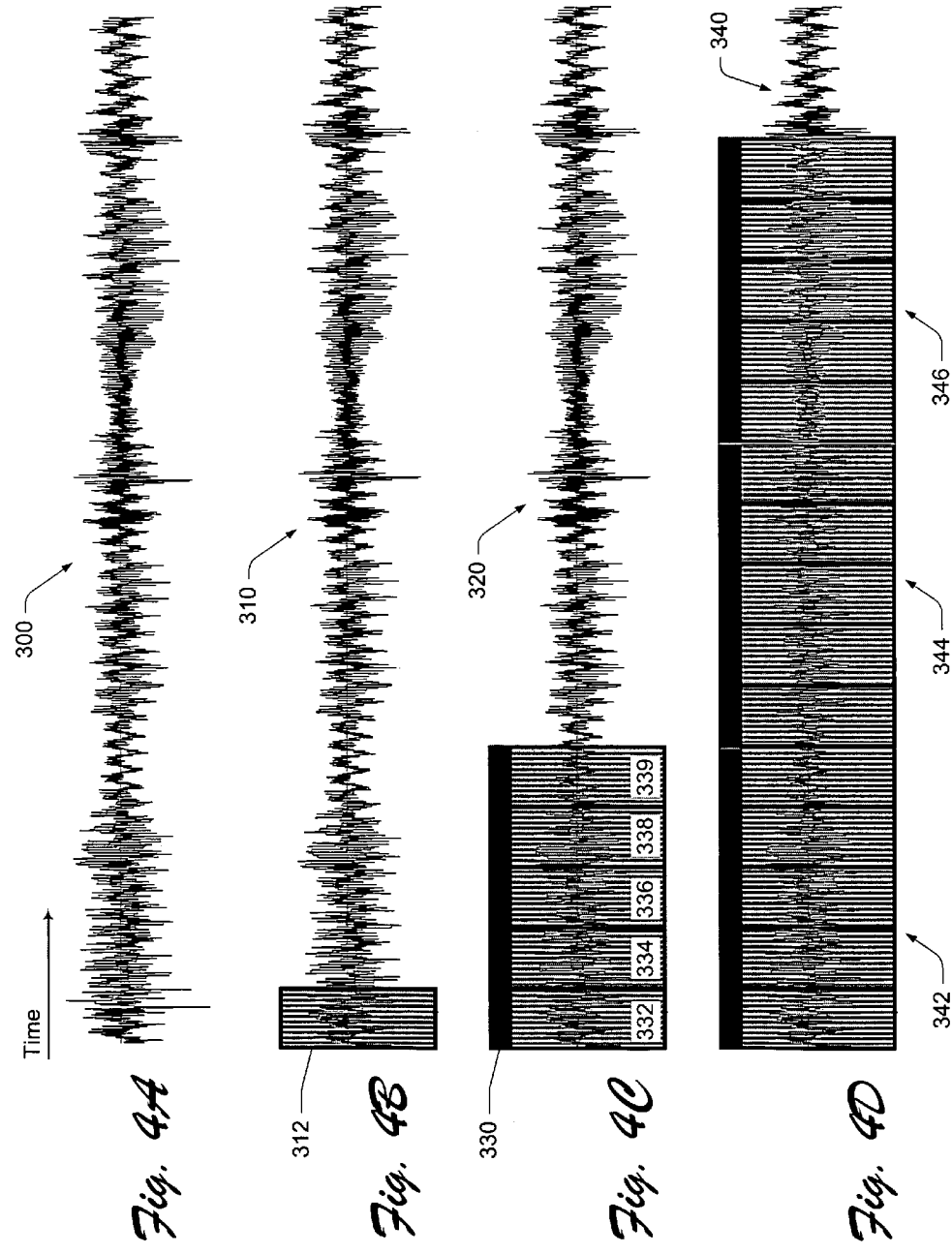

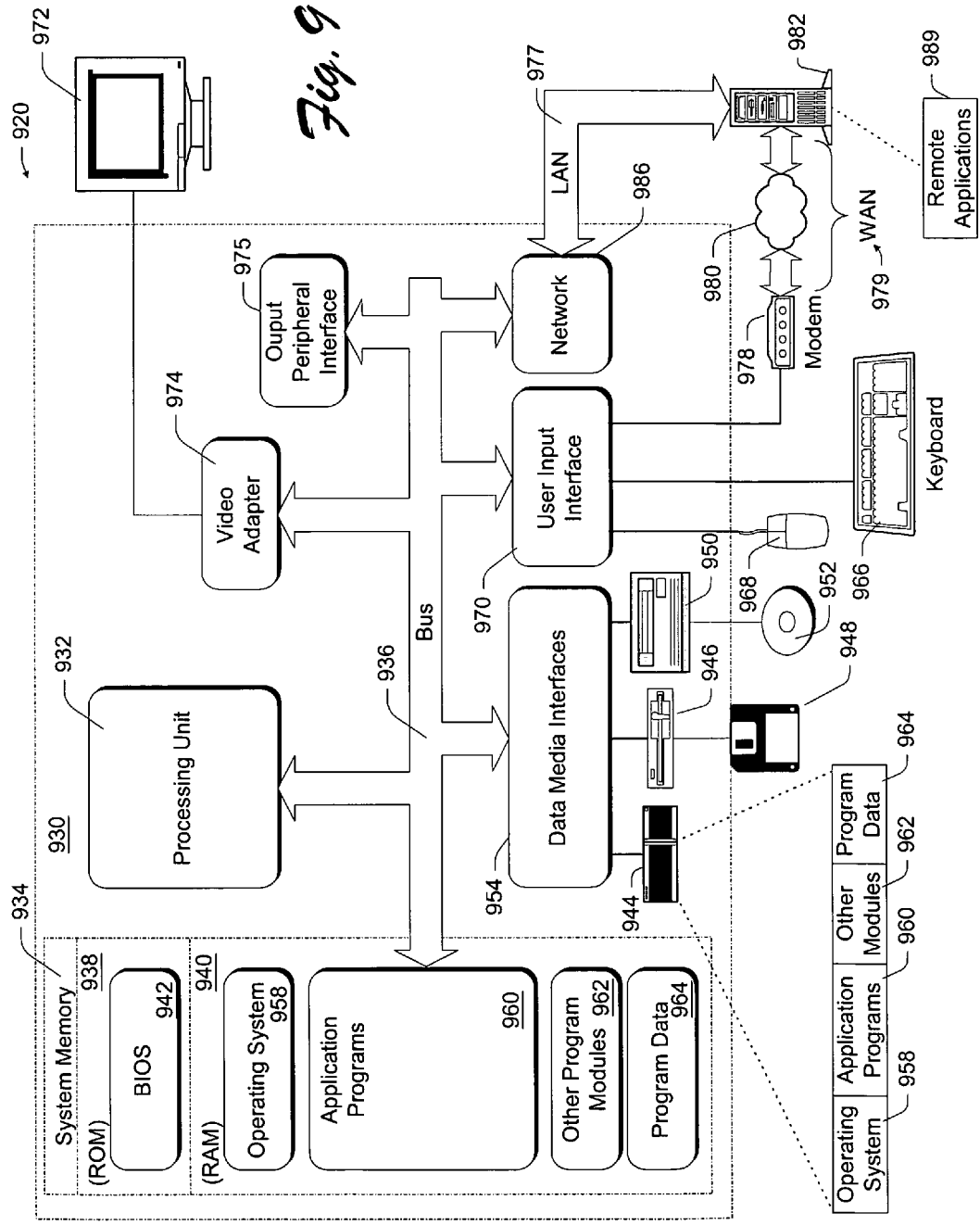

AUDIO WATERMARKING WITH COVERT CHANNEL AND PERMUTATIONS

CROSS-REFERENCE TO RELATED APPLICATIONS

This application claims priority from U.S. Provisional Patent Application Ser. No. 60/143,432 entitled "Improved Audio Watermarking" filed on Jul. 13, 1999.

TECHNICAL FIELD

This invention relates to protecting audio content by using watermarks. More particularly, this invention relates to improved techniques for inserting a covert channel into a signal and for permuting data, such as data of a covert channel inserted into such a signal.

BACKGROUND

Since the earliest days of human civilization, music has existed at the crossroads of creativity and technology. The urge to organize sound has been a constant part of human nature, while the tools to make and capture the resulting music have evolved in parallel with human mastery of science.

Throughout the history of audio recordings, the ability to store and transmit audio (such as music) has quickly evolved since the early days just 130 years ago. From Edison's foil cylinders to contemporary technologies (such as DVD-Audio, MP3, and the Internet), the constant evolution of prerecorded audio delivery has presented both opportunity and challenge.

Music is the world's universal form of communication, touching every person of every culture on the globe. Behind the music is a growing multi-billion dollar per year industry. This industry, however, is constantly plagued by lost revenues due to music piracy.

Protecting Rights

Piracy is not a new problem. However, as technologies change and improve, there are new challenges to protecting music content from illicit copying and theft. For instance, more producers are beginning to use the Internet to distribute music content. In this form of distribution, the content merely exists as a bit stream which, if left unprotected, can be easily copied and reproduced.

At the end of 1997, the International Federation of the Phonographic Industry (IFPI), the British Phonographic Industry, and the Recording Industry Association of America (RIAA) engaged in a project to survey the extent of unauthorized use of music on the Internet. The initial search indicated that at any one time there could be up to 80,000 infringing MP3 files on the Internet. The actual number of servers on the Internet housing infringing files was estimated to 2,000 with locations in over 30 countries around the world.

Each day, the wall impeding the reproduction and distribution of infringing digital audio clips (e.g., music files) gets shorter and weaker. "Napster" is an example of an application that is weakening the wall of protection. It gives individuals access to one another's MP3 files by creating a unique file-sharing system via the Internet. Thus, it encourages illegal distribution of copies of copyrighted material.

As a result, these modern digital pirates effectively rob artists and authors of music recordings of their lawful compensation. Unless technology provides for those who create music to be compensated for it, both the creative community and the musical culture at large will be impoverished.

Identifying a Copyrighted Work

Unlike tape cassettes and CDs, a digital music file has no jewel case, label, sticker, or the like on which the place the copyright notification and the identification of the author. A digital music file is a set of binary data without a detectible and unmodifiable label.

Thus, musical artists and authors are unable to inform the public that a work is protected by adhering a copyright notice to the digital music file. Furthermore, such artist and authors are unable to inform the public of any addition information, such as the identity of the copyright holder or terms of a limited license.

Digital Tags

The music industry and trade groups were especially concerned by digital recording because there is no generation loss in digital transfers—a copy sounds the same as the original. Without limits on unauthorized copying, a digital audio recording format could easily encourage the pirating of master-quality recordings.

One solution is to amend an associated digital "tag" with each audio file that identified the copyright holder. To implement such a plan, all devices capable of such digital reproduction must faithfully reproduce the amended, associated tag.

With the passage of the Audio Home Recording Act of 1992, inclusion of serial copying technology became law in the United States. This legislation mandated the inclusion of serial copying technology, such as SCMS (Serial Copy Management System), in consumer digital recorders. SCMS recognizes a "copyright flag" encoded on a prerecorded original (such as a CD), and writes that flag into the subcode of digital copies (such as a transfer from a CD to a DAT tape). The presence of the flag prevents an SCMS-equipped recorder from digitally copying the copy, thus breaking the chain of perfect digital cloning.

However, subsequent developments—both technical and legal—have demonstrated the limited benefits of this legislation. While digital secure music delivery systems (such as SCMS) are designed to support the rights of content owners in the digital domain, the problem of analog copying requires a different approach. In the digital domain, information about the copy status of a given piece of music may be carried in the subcode, which is separate information that travels along with the audio data. In the analog domain, there is no subcode; the only place to put the extra information is to hide it within the audio signal itself.

Digital Watermarks

Techniques for identifying copyright information of digital audio content that address both analog and digital copying instances have received a great deal of attention in both the industrial community and the academic environment. One of the most promising "digital labeling" techniques is augmentation of a digital watermark into the audio signal itself by altering the signal's frequency spectrum such that the perceptual characteristics of the original recording are preserved.

In general, a "digital watermark" is a pattern of bits inserted into a digital image, audio, or video file that identifies the file's copyright information (author, rights, etc.). The name comes from the faintly visible watermarks imprinted on stationery that identify the manufacturer of the stationery. The purpose of digital watermarks is to provide copyright protection for intellectual property that is in digital format.

Unlike printed watermarks, which are intended to be somewhat visible, digital watermarks are designed to be completely invisible, or in the case of audio clips, inaudible. Moreover, the actual bits representing the watermark must be scattered throughout the file in such a way that they cannot be identified and manipulated. And finally, the digital watermark must be robust enough so that it can withstand normal changes to the file, such as reductions from lossy compression algorithms.

Satisfying all these requirements is no easy feat, but there are several competing technologies. All of them work by making the watermark appear as noise—that is, random data that exists in most digital files anyway. To view a watermark, you need a special program or device (i.e., a "detector") that knows how to extract the watermark data.

Herein, such a digital watermark may be simply called a "watermark." Generically, it may be called an "information pattern of discrete values." The audio signal (or clip) in which a watermark is encoded is effectively "noise" in relation to the watermark.

Watermarking

Watermarking gives content owners a way to self-identify each track of music, thus providing proof of ownership and a way to track public performances of music for purpose of royalty distribution. It may also convey instructions, which can be used by a recording or playback device, to determine whether and how the music may be distributed. Because that data can be read even after the music has been converted from digital to an analog signal, watermarking can be a powerful tool to defeat analog circumvention of copy protection.

The general concept of watermarking has been around for at least 30 years. It was used by companies (such as Muzak™) to audibly identify music delivered through their systems. Today, however, the emphasis in watermarking is on inaudible approaches. By varying signals embedded in analog audio programs, it is possible to create patterns that may be recognized by consumer electronics devices or audio circuitry in computers.

For general use in the record industry today, watermarking must be completely inaudible under all conditions. This guarantees the artistic integrity of the music. Moreover, it must be robust enough to survive all forms of attacks. To be effective, watermarks must endure processing, format conversion, and encode/detect cycles that today's music may encounter in a distribution environment that includes radio, the Web, music cassettes, and other non-linear media. In addition, it must endure malevolent attacks by digital pirates.

Watermark Encoding

Typically, existing techniques for encoding a watermark within discrete audio signals facilitate the insensitivity of the human auditory system (HAS) to certain audio phenomena. It has been demonstrated that, in the temporal domain, the HAS is insensitive to small signal level changes and peaks in the pre-echo and the decaying echo spectrum.

The techniques developed to facilitate the first phenomenon are typically not resilient to de-synch attacks. Due to the difficulty of the echo cancellation problem, techniques that employ multiple decaying echoes to place a peak in the signal's cepstrum can hardly be attacked in real-time, but fairly easy using an off-line exhaustive search. (The term "cepstrum" is the accepted terminology for the inverse Fourier transform of the logarithm of the power spectrum of a signal.)

Watermarking techniques that embed secret data in the frequency domain of a signal facilitate the insensitivity of the HAS to small magnitude and phase changes. In both cases, a publisher's secret key is encoded as a pseudo-random sequence that is used to guide the modification of each magnitude or phase component of the frequency domain. The modifications are performed either directly or shaped according to the signal's envelope.

In addition, watermarking schemes have been developed which facilitate the advantages but also suffers from the disadvantages of hiding data in both the time and frequency domain. It has not been demonstrated whether spread-spectrum watermarking schemes would survive combinations of common attacks: de-synchronization in both the temporal and frequency domain and mosaic-like attacks.

Watermark Detection

The copy detection process is performed by synchronously correlating the suspected audio clip with the watermark of the content publisher. A common pitfall for all watermarking systems that facilitate this type of data hiding is intolerance to desynchronization attacks (e.g., sample cropping, insertion, repetition, variable pitch-scale and time-scale modifications, audio restoration, and arbitrary combinations of these attacks) and deficiency of adequate techniques to address this problem during the detection process.

Desiderata of Watermarking Technology

Watermarking technology has several highly desirable goals (i.e., desiderata) to facilitate protection of copyrights of audio content publishers. Below are listed several of such goals.

Perceptual Invisibility. The embedded information should not induce audible changes in the audio quality of the resulting watermarked signal. The test of perceptual invisibility is often called the "golden ears" test.

Statistical Invisibility. The embedded information should be quantitatively imperceptive for any exhaustive, heuristic, or probabilistic attempt to detect or remove the watermark. The complexity of successfully launching such attacks should be well beyond the computation power of publicly available computer systems.

Tamperproofness. An attempt to remove the watermark should damage the value of the music well above the hearing threshold.

Cost. The system should be inexpensive to license and implement on both programmable and application-specific platforms.

Non-disclosure of the Original. The watermarking and detection protocols should be such that the process of providing audio content copyright both in-situ and in-court, does not involve usage of the original recording.

Enforceability and Flexibility. The watermarking technique should provide strong and undeniable copyright proof. Similarly, it should enable a spectrum of protection levels, which correspond to variable audio presentation and compression standards.

Resilience to Common Attacks. Public availability of powerful digital sound editing tools imposes that the watermarking and detection process is resilient to attacks spawned from such consoles. The standard set of plausible attacks is itemized in the Request for Proposals (RFP) of IFPI (International Federation of the Phonographic Industry) and RIAA (Recording Industry Association of America). The RFP encapsulates the following security requirements:

two successive D/A and A/D conversions,
data reduction coding techniques such as MP3,
adaptive transform coding (ATRAC),
adaptive subband coding,
Digital Audio Broadcasting (DAB),
Dolby AC2 and AC3 systems,
applying additive or multiplicative noise, applying a second Embedded Signal, using the same system, to a single program fragment, frequency response distortion corresponding to normal analogue frequency response controls such as bass, mid and treble controls, with maximum variation of 15 dB with respect to the original signal, and applying frequency notches with possible frequency hopping.

Watermark Circumvention

If the encoding of a watermark can thwart a malicious attack, then it can avoid the harm of the introduction of unintentional noise. Therefore, any advancement in watermark technology that makes it more difficult for a malevolent attacker to assail the watermark also makes it more difficult for a watermark to be altered unintentionally.

In general, there are two common classes of malevolent attacks:

1. De-synchronization of watermark in digital audio signals. These attacks alter audio signals in such a way to make it difficult for the detector to identify the location of the encoded watermark codes.
2. Removing or altering the watermark. The attacker discovers the location of the watermark and intentionally alters the audio clip to remove or deteriorate a part of the watermark or its entirety.

Framework to Thwart Attacks

Accordingly, there is a need for a new framework of protocols for hiding and detecting watermarks in digital audio signals that are effective against malevolent attacks. The framework should possess several attributes that further the desiderata of watermark technology, described above. For example, such desiderata include "perceptual invisibility" and "statistical invisibility". The framework should be tamperproof and inexpensive to license and implement on both programmable and application-specific platforms. The framework should be such that the process of proving audio content copyrights both in-situ and in-court does not involve usage of the original recording.

The framework should also be flexible to enable a spectrum of protection levels, which correspond to variable audio presentation and compression standards, and yet resilient to common attacks spawned by powerful digital sound editing tools.

SUMMARY

Described herein is an audio watermarking technology for inserting and detecting watermarks in audio signals, such as a music clip. The watermark identifies the content producer, providing a signature that is embedded in the audio signal and cannot be removed. The watermark is designed to survive all typical kinds of processing, including compression, equalization, D/A and A/D conversion, recording on analog tape, and so forth. It is also designed to survive malicious attacks that attempt to remove or modify the watermark from the signal, including changes in time and frequency scales, pitch shifting, and cut/paste editing.

In one described implementation, a watermarking system employs covert channel encoder to layer an additional information data message on top of the watermark. Thus, an informational message is imposed upon the existing watermark encoded in a signal.

In another described implementation, a watermarking system employs a permutation technique to further hide the watermark and it may hide the covert message within the watermark. The order in which data is imposed or encoded is rearranged based upon a permutation table. The same table is used to reverse permute the data at the detector.

BRIEF DESCRIPTION OF THE DRAWINGS

The same numbers are used throughout the drawings to reference like elements and features.

FIGS. 4A-4E show graphs of an audio clip to illustrate blocking, framing, bitframing, and windowing of such audio clip.

FIG. 9 is an example of a computing operating environment capable of implementing the improved audio watermarking with covert channel and permutations.

DETAILED DESCRIPTION

The following description sets forth specific embodiments of the improved audio watermarking with covert channel and permutations that incorporate elements recited in the appended claims. These embodiments are described with specificity in order to meet statutory written description, enablement, and best-mode requirements. However, the description itself is not intended to limit the scope of this patent. Rather, the inventors have contemplated that the claimed improved audio watermarking with covert channel and permutations might also be embodied in other ways, in conjunction with other present or future technologies.

Incorporation by Reference

The following provisional application (from which priority is claimed) is incorporated by reference herein: U.S. Provisional Patent Application Ser. No. 60/143,432 entitled "Improved Audio Watermarking" filed on Jul. 13, 1999.

In addition, the following co-pending patent applications are incorporated by reference herein:

U.S. patent application Ser. No. 09/316,899, entitled "Audio Watermarking with Dual Watermarks" filed on May 22, 1999, and assigned to the Microsoft Corporation; and U.S. patent application Ser. No. 09/259,669, entitled "A System and Method for Producing Modulated Complex Lapped Transforms" filed on Feb. 26, 1999, and assigned to the Microsoft Corporation.

The following U.S. Patent is incorporated by reference herein: U.S. Pat. No. 6,029,126, entitled "Scalable Audio Coder and Decoder" issued on Feb. 22, 2000, and assigned to the Microsoft Corporation.

Introduction

Described herein are at least two exemplary implementations of improved audio watermarking with covert channel and permutations (i.e., "exemplary watermarking"). The first exemplary watermarking implementation employs covert channel encoder to layer an additional information data message on top of the watermark. Thus, an informational message is imposed upon the existing watermark encoded in a signal. The second exemplary watermarking implementation employs a permutation technique to further hide the watermark and it may hide the covert message within the watermark. The order in which data is imposed or encoded is rearranged based upon a permutation table. The same table is used to reverse permute the data at the detector.

Figure 1:
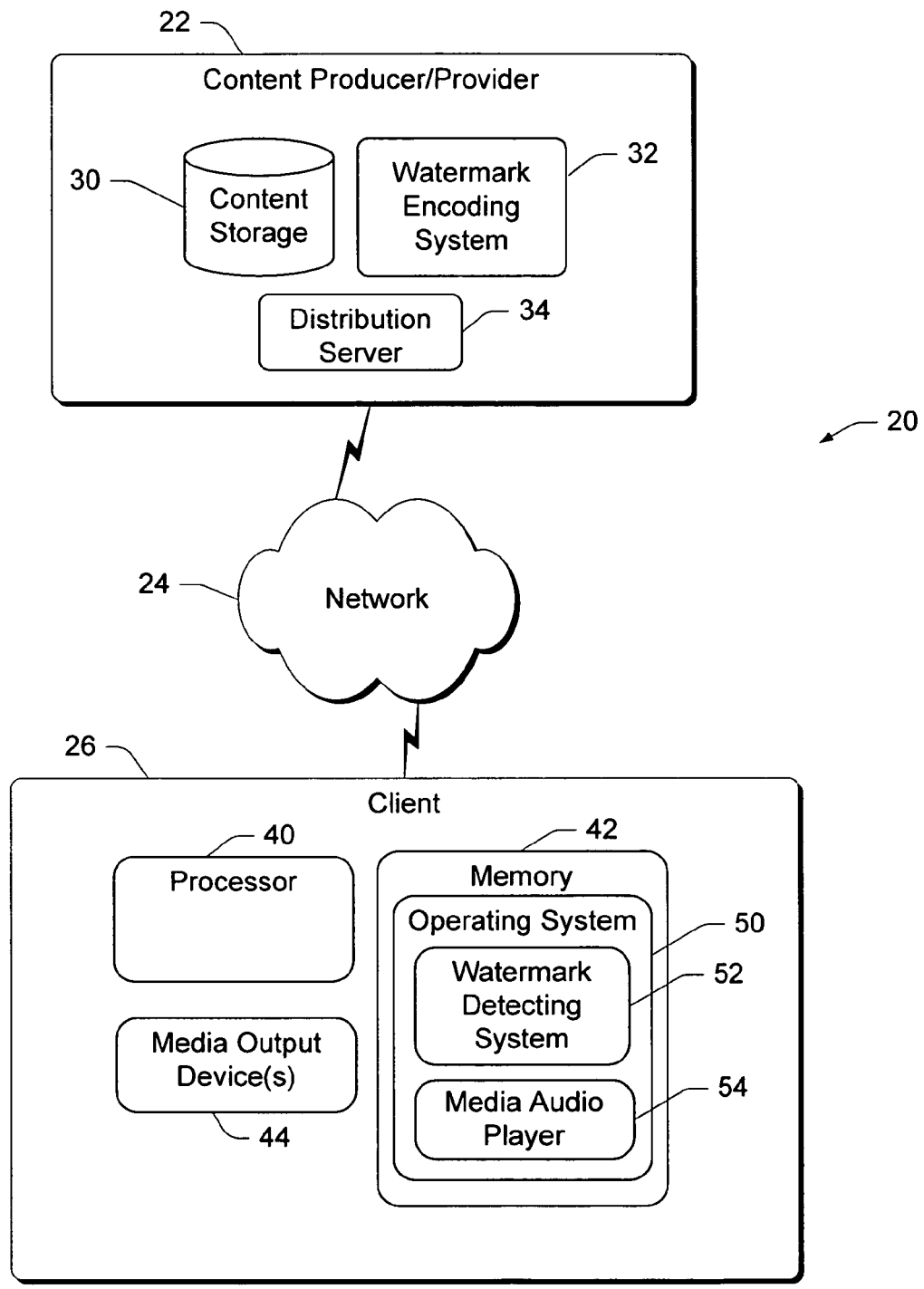
FIG. 1 is a block diagram of an audio production and distribution system in which a content producer/provider watermarks audio signals and subsequently distributes that watermarked audio stream to a client over a network.

The exemplary watermarking implementations, described herein, may be at least implemented by an audio production and distribution system like that shown in FIG. 1 and by a computing environment like that shown in FIG. 9.

A watermark may be generically called an "information pattern of multiple discrete values" because it is a pattern of binary bits designed to convey information. It may also be referred to as a "data pattern." A watermark is encoded in a digital audio signal (or clip). In relation to the watermark, the audio signal is effectively "noise." In general, watermarking involves hiding the information of the watermark within the "noise" of a digital signal.

Audio Production and Distribution System Employing Watermarks

FIG. 1 shows an audio production and distribution system 20 having a content producer/provider 22 that produces original musical content and distributes the musical content over a network 24 to a client 26. The content producer/provider 22 has a content storage 30 to store digital audio streams of original musical content. The content producer 22 has a watermark encoding system 32 to sign the audio data stream with a watermark that uniquely identifies the content as original. The watermark encoding system 32 may be implemented as a standalone process or incorporated into other applications or an operating system.

A watermark is an array of bits generated using a cryptographically secure pseudo-random bit generator and a new error correction encoder. The pseudo-uniqueness of each watermark is provided by initiating the bit generator with a key unique to each audio content publisher. The watermark is embedded into a digital audio signal by altering its frequency magnitudes such that the perceptual audio characteristics of the original recording are preserved. Each magnitude in the frequency spectrum is altered according to the appropriate bit in the watermark.

The watermark encoding system 32 applies the watermark to an audio signal from the content storage 30. Typically, the watermark identifies the content producer 22, providing a signature that is embedded in the audio signal and cannot be removed. The watermark is designed to survive all typical kinds of processing, including compression, equalization, D/A and A/D conversion, recording on analog tape, and so forth. It is also designed to survive malicious attacks that attempt to remove the watermark from the signal, including changes in time and frequency scales, pitch shifting, and cut/paste editing.

The content producer/provider 22 has a distribution server 34 that streams the watermarked audio content over the network 24 (e.g., the Internet). An audio stream with a watermark embedded therein represents to a recipient that the stream is being distributed in accordance with the copyright authority of the content producer/provider 22. The server 34 may further compress and/or encrypt the content conventional compression and encryption techniques prior to distributing the content over the network 24.

The client 26 is equipped with a processor 40, a memory 42, and one or more media output devices 44. The processor 40 runs various tools to process the audio stream, such as tools to decompress the stream, decrypt the date, filter the content, and/or apply audio controls (tone, volume, etc.). The memory 42 stores an operating system 50 (such as a Microsoft® Windows 2000® operating system), which executes on the processor. The client 26 may be embodied in a many different ways, including a computer, handheld entertainment device, a set-top box, a television, an audio appliance, and so forth.

The operating system 50 implements a client-side watermark detecting system 52 to detect watermarks in the audio stream and a media audio player 54 to facilitate play of the audio content through the media output device(s) 44 (e.g., sound card, speakers, etc.). If the watermark is present, the client can identify its copyright and other associated information.

The operating system 50 and/or processor 40 may be configured to enforce certain rules imposed by the content producer/provider (or copyright owner). For instance, the operating system and/or processor may be configured to reject fake or copied content that does not possess a valid watermark. In another example, the system could play unverified content with a reduced level of fidelity.

Watermark Insertion and Detection

Figure 2:
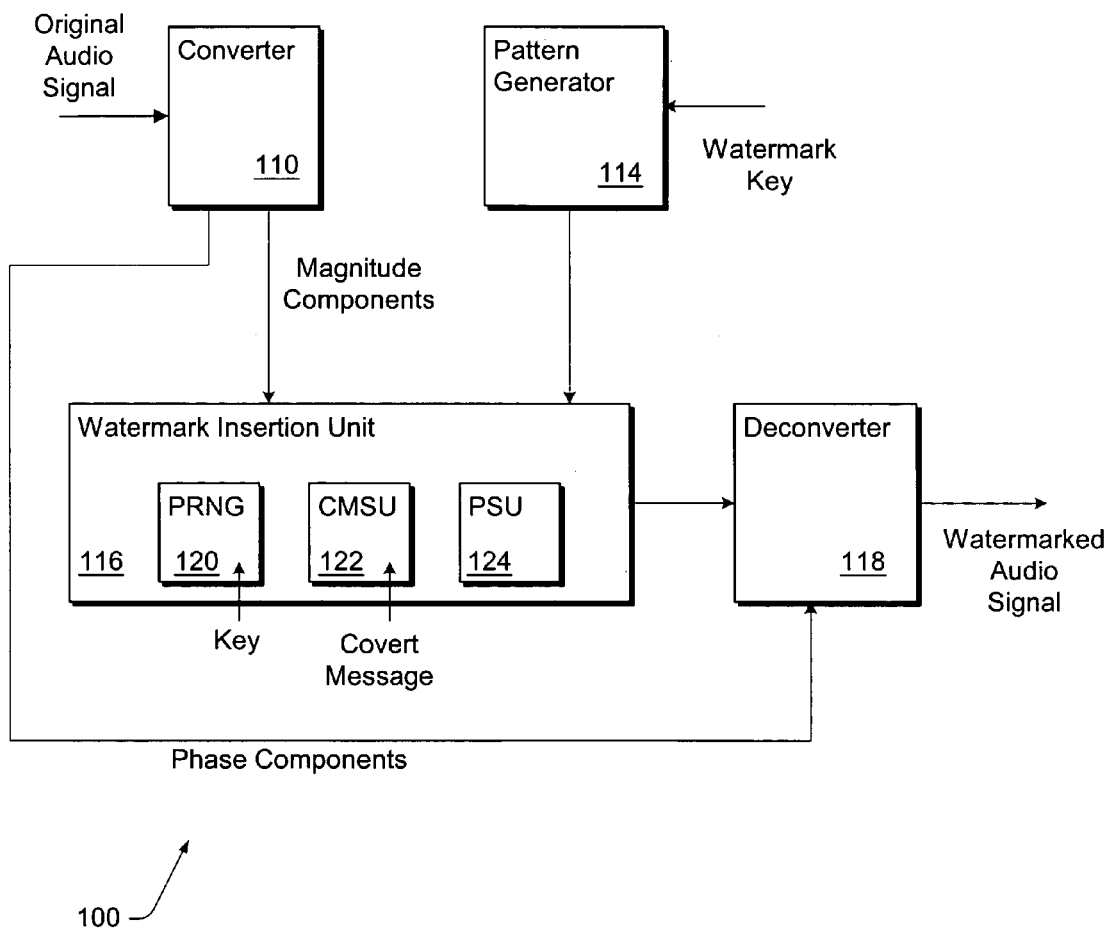
FIG. 2 is a block diagram of a watermarking encoding system implemented, for example, at the content producer/provider.

In general, FIG. 2 shows a watermark encoding system 100 (or simply "watermark encoder") that may be implemented at a content provider/producer to encode the audio signal with a watermark. The watermark encoding system 100 has a converter 110 to convert an audio signal into frequency and phase components and a mask frequency-processor domain magnitude and phase components. It may also include an energy-level trigger (not shown) to determine a hearing threshold for corresponding frequency components. The trigger determines whether the energy level across a portion of the signal warrants encoding of the watermark in that portion.

The watermark encoding system 100 also has a pattern generator 114 to generate the watermark, and a watermark insertion unit (WIU) 116 to insert the watermark into the audio signal. It also has a deconverter 118 to convert the audio signal back into the time domain.

Within the WIU 116 (or closely associated therewith) are a pseudorandom number generator (PRNG) 120, a covert message subunit (CMSU) 122, and a permutation subunit (PSU) 124. The PRNG 120 calculates values in a pseudorandom fashion based upon a key. Typically, this key is the same key used to generate the watermark by the pattern generator 114. The CMSU 122 imposes a covert message onto a watermark. The PSU 124 permutes (i.e., reorders) values encoded into the audio signal.

Figure 3:
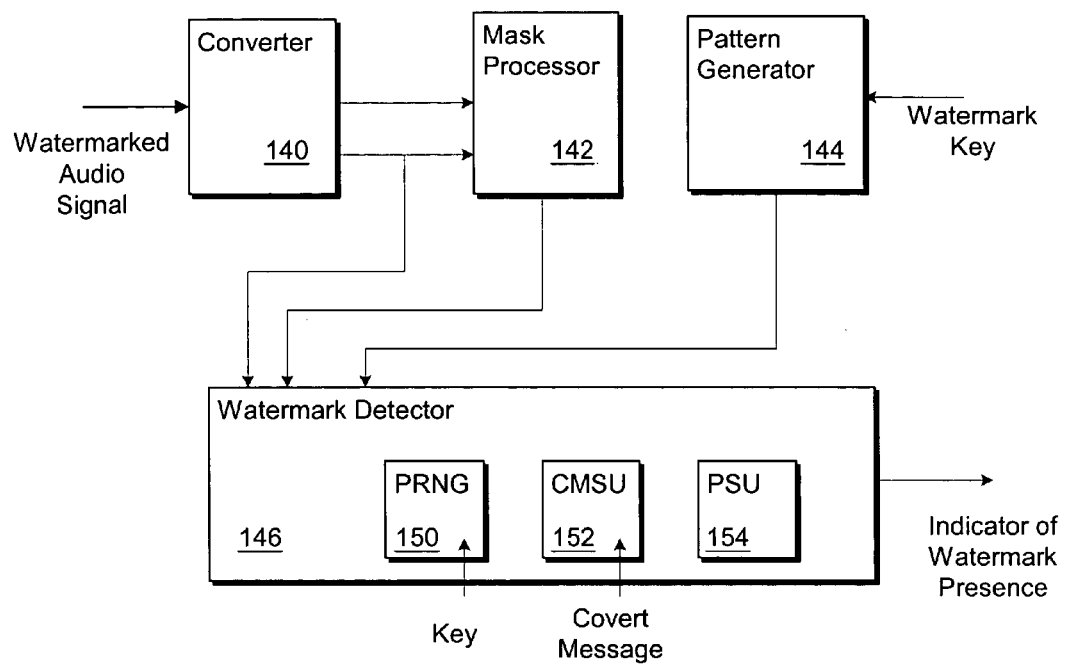
FIG. 3 is a block diagram of a watermarking detecting unit implemented, for example, at the client.

In general, FIG. 3 shows a watermark detecting system 130 that may be implemented at a client that plays the audio clip (containing the audio signal). Like the encoding system 100, the watermark detecting system 130 has a converter 140, a mask processor 142, and a watermark pattern generator 144. It is also equipped with a watermark detector 146 that locates a watermark in the audio clip. The watermark detector 146 determines which block interval of the watermarked audio signal contains the watermark pattern and if the watermark generated by a particular key is present in that block interval of the signal.

The watermark encoding system 100 has a deconverter 118 to convert the audio signal back into the time domain. Pseudorandom number generator (PRNG) 120 is employed to implement the exemplary watermarking, but its role is explained later.

In general, FIG. 3 shows a watermark detecting system 130 (or simply "watermark detector") that may be implemented at a client that plays the audio clip (containing the audio signal). Also, it may be implemented in an audio management and distribution subsystem (for example, in an application that downloads music clips from the Internet and uploads them to portable devices).

The watermark detecting system 130 has a converter 140, a mask processor 142, and a watermark pattern generator 144. The converter 140 converts an audio signal that is suspected to include a watermark. It converts the signal into its frequency-domain magnitudes. The mask processor 142 determines the hearing threshold for frequency-domain magnitude components. The pattern generator 144 generates a comparison watermark based upon the same watermark key as used by the encoder. The pattern generator 144 typically includes a pseudorandom number generator (PRNG) to generate the comparison watermark based upon a watermark key.

The watermark detecting system 130 is also equipped with a watermark detector 146 that locates a watermark in the audio clip. The watermark detector 146 determines which block interval of the watermarked audio signal contains a watermark pattern and whether that discovered watermark pattern matches the comparison watermark generated by the pattern generator 144.

The watermark detection unit 146 typically includes a pseudorandom number generator (PRNG) 150, a covert message subunit (CMSU) 152, and a permutation subunit (PSU) 154. The PRNG 150 calculates values in a pseudorandom fashion based upon a key. That key to generate typically is the same key used to generate the watermark by the pattern generator 114 of the encoder and the pattern generator 144 of the detector. The CMSU 152 extracts the covert message from a watermark. The PSU 154 reverse-permutes (i.e., returns to original order) values encoded into the audio signal.

Blocks, Frames, Bitframes, and Windows

Blocks. During the encoding, the original audio signal is processed into equally sized, overlapping, time-domain blocks. Each of these blocks is the same length of time. For example, one second, two seconds, 50 milliseconds, and the like. In addition, these blocks overlap equally so that half of each block (except the first and last) is duplicated in an adjacent block.

For example, suppose that an entire audio clip is divided into overlapping, two-second long, time-domain blocks. In this example, each block has a one second overlap with its neighbors. If the clip were about 3.5 minutes long, then there would be about 210 blocks.

FIG. 4A shows a graph 300 of an audio signal in the time domain. Time advances from left to right. FIG. 4B shows a graph 310 of the same audio signal sampled over the same time period. FIG. 4B includes a block 312 representing a first of equally spaced, overlapping, time-domain blocks.

Each block is transformed by a MCLT (modulated complex lapped transform) to the frequency domain. This produces a vector having a defined number of magnitude components. The magnitude is measured in a logarithmic scale, in decibels (dB).

Frames. FIG. 4C shows a graph 320 of the same audio signal sampled over the same time period. In FIG. 4C, there is a set 330 of five adjacent blocks 332-339. The blocks represent equally spaced, overlapping, time-domain blocks. (For simplicity, the overlapping nature of the blocks is not shown.) The set 330 of blocks is called a "frame."

In general, a frame may include any given number of blocks. However, if it is too long, the watermark is more likely to be noticed by a digital pirate. If it is too short, the bits of the watermark may be had to find for the watermark detector. In addition, the optimum number of blocks in a frame depends upon the block size. The proper number of block per frames for a given implementation can be determined with a minimum of empirical measurements. Three to seven blocks per frame may be appropriate for one implementation, but nine to eleven blocks per frame may be better for another.

Bitframes. FIG. 4D shows a graph 340 of the same audio signal sampled over the same time period. In FIG. 4D, there is a series of three contiguous frames 342, 344, and 346. Each frame has five neighboring blocks. (For simplicity, the overlapping nature of the blocks is not shown.) The series of contiguous frames (342, 344, and 346) is called a "bitframe."

In general, a bitframe may include any given number of frames. One bit of the covert data is encoded into each bitframe. Hence, the name "bitframe." The proper number of frames per bitframe for a given implementation can be determined with a minimum of empirical measurements. Four frames per bitframe may be appropriate for one implementation, but eight frames per bitframe may be better for another.

Figure 4E:
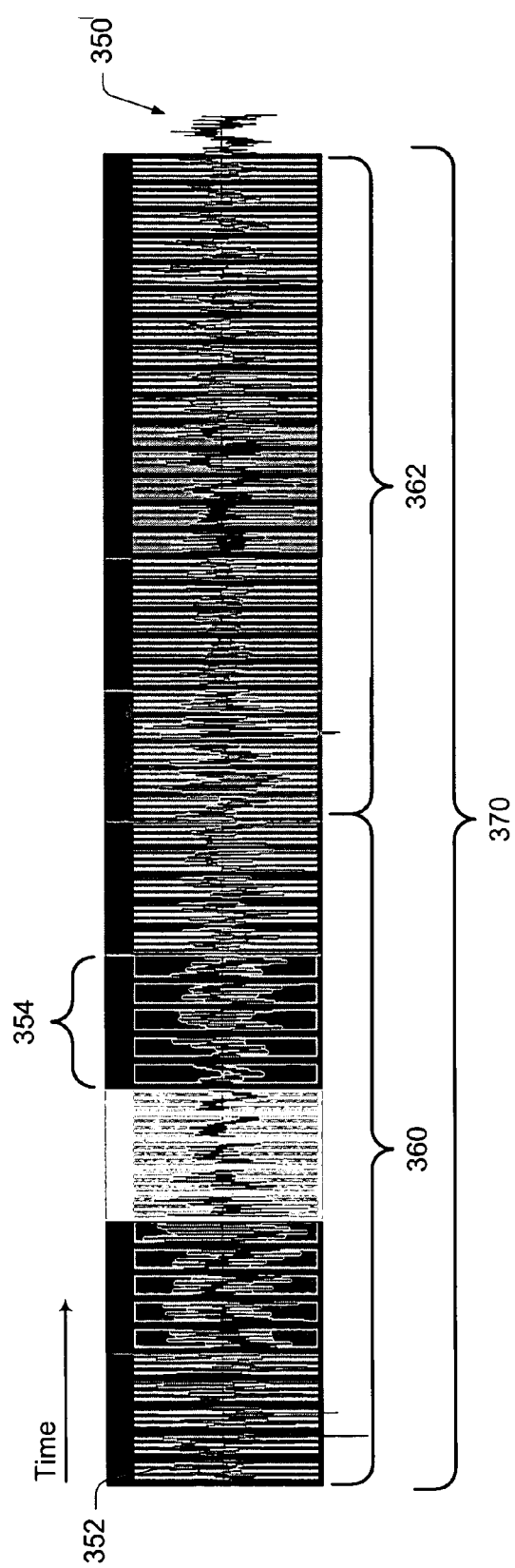

Windows. FIG. 4E shows a graph 350 of the same audio signal sampled over the same time period. In FIG. 4E, there is a collection 370 of neighboring bitframes 360 and 362. Each bitframe is composed of five contiguous frames (such as frame 354). Each frame has five adjacent blocks (such as block 352). (For simplicity, the overlapping nature of the blocks is not shown.) The collection of neighboring bitframes (360 and 362) is called a "window."

In general, a window may include any given number of bitframes. The proper number for a given implementation can be determined with a minimum of empirical measurements. Four bitframes per window may be appropriate for one implementation, but ten bitframes per window may be better for another.

Figure 5:
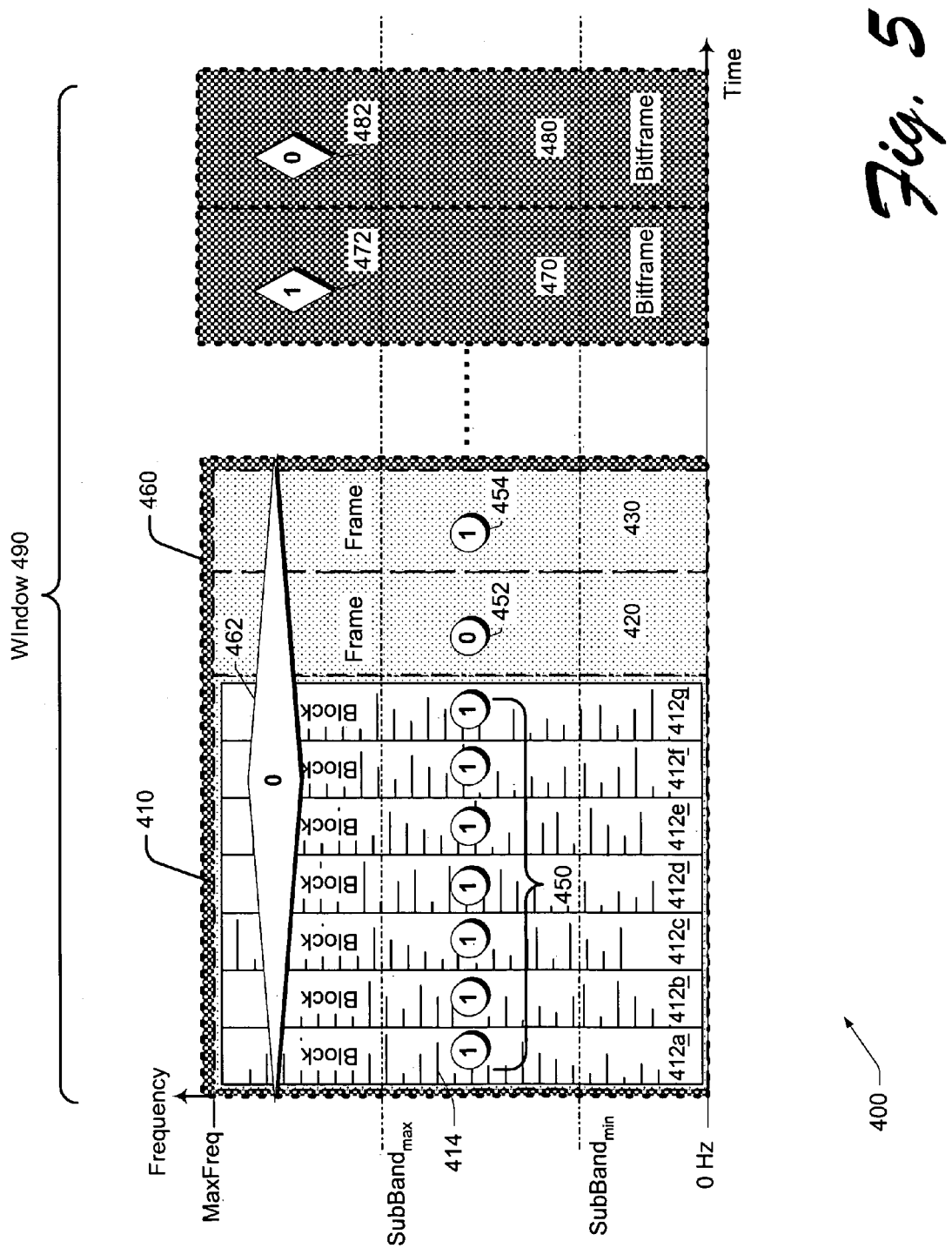
FIG. 5 illustrates sample blocks, frames, bitframes, and windows of an audio clip and it further illustrates the encoding of bit values of a watermark within such blocks and frames. It still further illustrates the encoding of covert bit values of a covert message over bitframes.

Graph illustrating Blocks, Frames, Bitframes, and Windows. FIG. 5 shows a graph 400 of the same audio clip of FIGS. 4A-4E, but this graph does not show the clip in the time domain. Rather, it shows a graph in the frequency-domain for each overlapping, time-domain block (like blocks 332-339 in FIG. 4C). Time advances from left to right. Frequency increases from bottom to top. From zero to a maximum frequency of interest ("MaxFreq").

In FIG. 5, each of blocks 412a-g contain a frequency-domain graph for its time blocks. Horizontal hash marks, like mark 414, represent the magnitude of a given frequency range. The watermark is encoded in multiple frequency sub-bands in a range from "$SubBand_{max}$" line and "$SubBand_{min}$" line as shown in FIG. 5.

A given number of blocks (such as blocks 412a-g) form a "frame" (such as frame 410). Each frame in this audio clip includes the same number of blocks. In FIG. 5, frames 420 and 430 include the same number of blocks.

FIG. 5 also illustrates bitframes 460, 470, and 480 and a window 490. Bitframe 460 includes three frames (410, 420, and 430). Likewise, each bitframe in this clip contains three frames.

Encoding Bits of a Watermark

A watermark is composed of a given number of bits (such as eighty bits). The bits of a watermark are encoded by slightly increasing and decreasing the magnitude of frequencies within a block. More specifically, magnitudes of sub-bands of frequencies are slightly modified.

This slight change is plus or minus Q decibel (dB), where Q is set to 1 for example. Overall, these frequency changes are not heard because they are so tiny. Again, these frequency magnitudes are represented by horizontal hash marks in FIG. 5, like mark 414.

More specifically, only the frequencies between the SubBand$_{max}$ and SubBand$_{min}$ lines are modified to encode a bit of the watermark.

Redundancy Encoding

Successive Redundancy of Full Watermark. Using the exemplary watermarking, successive bits of a watermark are encoded into successive frames. One bit is encoded in each frame. For example, suppose the watermark is eighty bits long. The first three bits of the watermark in this example is "101." Also, suppose that frame 410 is frame one, frame 420 is frame two, and so forth until frame eighty is reached.

In this example, frame 410 of FIG. 5 will have the first bit of the watermark encoded therein. That bit is "1" and is represented by circular "bit-value-indicator" 450. Frame 420 will have the second bit of the watermark encoded therein. That bit is "0" and is represented by bit-value-indicator 452. Frame 430 will have the third bit of the eighty-bit watermark encoded therein. That bit is "1" and is represented by bit-value-indicator 454.

Typically, the full audio clip in which the watermark is being encoded is longer than time elapsed for the eighty frames. Therefore, this process is repeated until the end of the audio clip. In one implementation, it was determined that approximately eleven seconds was required to encode a watermark. Thus, in a four-minute clip, the watermark will be encoded approximately twenty-one times in successive sets of eighty frames.

Redundancy within a Frame. As described above, each frame has one bit of the watermark encoded therein. That one bit is encoded in each block of a frame. This means that within each block in a frame is encoded the exact same bit. For example, bit-value-indicator 450 of FIG. 5 shows that each block in frame 410 has a bit value of "1" encoded therein.

When a bit of a watermark is detected from an audio clip, the detector reads the bit from the block in the middle of frame. In frame 410 of FIG. 5, the middle block is block 412$d$.

The redundancy within a frame is designed to thwart malevolent desynchronization attacks in the time-domain. In other words, it lessens the effect of time-shifting the audio clip. Since it reads what it believes to be the middle block of a frame, it will still read the correct bit value even if the clips is shifted over an amount of time equal to about half of a frame.

Covert Channel

A covert data channel (or simply "covert channel") is a hidden layer of data imposed upon an existing data channel. In other words, a data signal containing a given amount of information data is modified so that it carrier additional information data. Furthermore, this additional information layer is added without increasing the bandwidth to carry the signal. For example, suppose that a digital signal carries a hundred bits of data with the original information data encoded therein. With the covert channel, the new signal still carries a hundred bits.

Moreover, the additional information data of the covert channel is not readily identifiable as such. Rather, to an uninformed observer, the signal appears to convey only one layer of information.

Covert Channel Watermarking

There are two exemplary embodiments of the exemplary covert channel watermarking. One is "modulated covert channel" and the other is "multiple watermarks covert channel." Both layer a covert message over a watermark. The resulting converted watermark is encoded into a signal. A covert message may be nearly any type of message. For example, a covert message may be a street address, a phone number, a name, a Web address, an e-mail address, terms of a license, etc.

Both embodiments clandestinely insert a covert message over the existing watermark and the watermark is encoded into a digital audio signal. Both impose one bit of the covert message over an entire bitframe. Hence, the name "bitframe." A bitframe, itself, encodes some portion of the watermark. That portion is equivalent to X number of bits of the watermark, where X is the number of frames in a bitframe. Herein, "imposing" a covert data channel over an original data channel (i.e., one or more bits of a data pattern) means that the original data channel is altered or modified to carry the covert channel. However, the size (i.e., number of bits, bandwidth) of the data channel encoded in a signal is no greater than the original data channel. Furthermore, it means that the covert data channel is decipherable and the existing data channel is, at least, detectible. Herein, "extracting" is the reverse of imposing. The covert data channel is decipherable within the data channel of the signal.

FIG. 5 shows bitframes 460, 470, 480. It also shows each bitframe with a diamond-shaped bit-value-indicator (462, 472, and 482). Each bit-value-indicator specifies the value of the bit of the covert message (i.e., "covert bit") imposed upon all of the blocks and frames of the bitframe. For example, the value "0" of bit-value-indicator 462 of bitframe 460 is imposed upon all of the blocks (such as 412$a$-412$g$) of all of the frames (410, 420, and 430) of bitframe 460.

Unlike the watermark itself, the covert message need not repeat throughout the clip. It may repeat, but it need not repeat at the same frequency. A window (such as window 490 of FIG. 5) is a collection of bitframes that represents either the entire covert message or some portion of the covert message. The next window may include a different covert message or the next portion of such message. Alternatively, the next window may repeat the same message.

The combining of a covert bit over a chip of the watermark is accomplished, for example, by XORing the covert bit with the bits of the chip together. The results of such operation are encoded into the signal.

XOR is a Boolean operator (also known as the "exclusive OR" operator) that returns a value of TRUE ("1") only if just one of its operands is TRUE ("1"). In contrast, an inclusive OR operator returns a value of TRUE ("1") if either or both of its operands are TRUE ("1").

Modulated Covert Channel. Each covert bit is modulated up or down to generate the covert message. More specifically, up indicates a "1" and down indicates a "0". More specifically still, the frequency magnitudes are modulated one of two discrete states: "+Q" for "1" and "−Q" for zero, where Q is usually set to 1.0 dB. The detector can determine the message by translating the positive and negative results (i.e., two states) into the covert message.

In order to detect the watermark with this modulated covert channel layered onto of it, the detector will focus on the absolute value of the results of some of its watermark detection processes (e.g., normalized correlation formulas). Otherwise, the results of such processes will produce negative values when they would have produced positive values absent such a modulated covert channel.

Using this modulated covert channel, the window size may be any specified size. It may span across multiple repetitions of the watermark.

Multiple Watermark Covert Channel. In this technique, a window is composed of N bitframes. Within each window, a N-bit chip of one of $2^N$ watermarks is encoded. That N-bit chip of one of $2^N$ watermarks indicates a value of an N-bit chip of a covert message. The covert message is the combination of these values of N-bit chips.

The pattern generator of the encoder generates $2^N$ watermarks based upon a given key. If N is four, then the encoder generates sixteen watermarks. The encoder selectively encodes a chip of one of the sixteen watermarks into each window. The window is four (where N=four) bitframes in size; thus, it can encode a 4-bit chip therein.

The table below illustrates the relationship between each of sixteen watermarks (where N=4; thus $2^N$=16) and each chip of four bits (where=4) of a covert message:

| Chip of Covert Message | $2^4$ Watermarks |
| --- | --- |
| 0000 | watermark 1 |
| 0001 | watermark 2 |
| 0010 | watermark 3 |
| 0011 | watermark 4 |
| 0100 | watermark 5 |
| 0101 | watermark 6 |
| 0110 | watermark 7 |
| 0111 | watermark 8 |
| 1000 | watermark 9 |
| 1001 | watermark 10 |
| 1010 | watermark 11 |
| 1011 | watermark 12 |
| 1100 | watermark 13 |
| 1101 | watermark 14 |
| 1110 | watermark 15 |
| 1111 | watermark 16 |

When the chip of the covert message is "1101," then "watermark 14" is encoded within the signal. Conversely, when the detector detects "watermark 14," it knows that the chip of the covert message is "1101." The detector can recognize the detected watermark to be one the sixteen watermarks because its pattern generator generates the sixteen watermarks based upon the same key as the encoder used.

Permutations

Herein, a "permutation" is a reordering of a set of data and a "reverse of a permutation" is returning a permuted set of data back to its original order. A collection of bits (such as a chip in a watermark) is an example of a set of data. Permutation may be used to further hide covert bits, which are written to the bitframes of a window. Alternatively, it may be used to further hide the watermark alone (without any covert channel).

Figure 6:
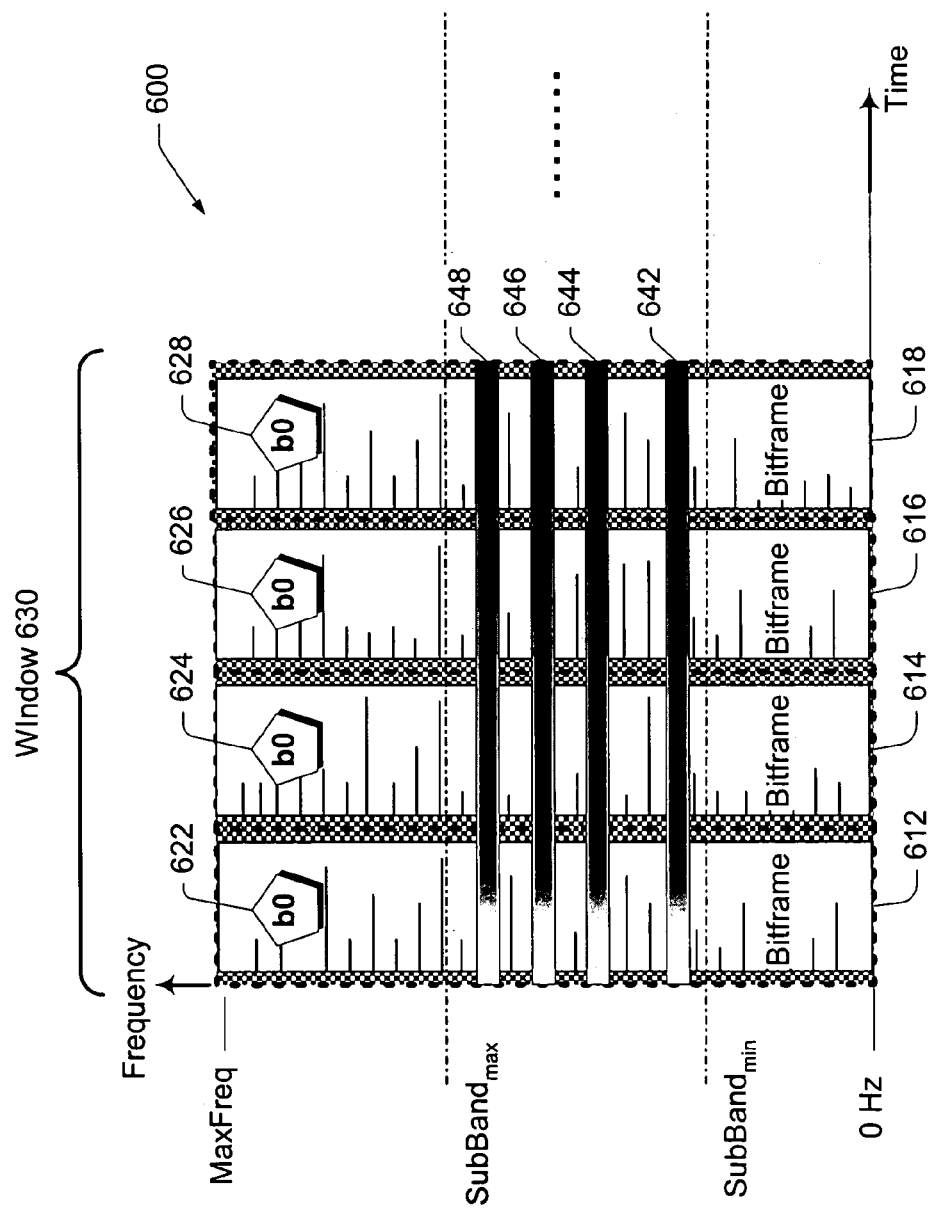
FIG. 6 illustrates sample bitframes and a window of an audio clip to show a permutation technique of an implementation of watermarking.

FIG. 6 shows a graph 600 of an audio clip, but this graph does not show the clip in the time domain. Rather, it shows a graph in the frequency-domain of bitframes of frames of overlapping, time-domain blocks. For simplicity, the frames and blocks are not shown. Time advances from left to right. Frequency increases from bottom to top.

Graph 600 shows an example window 630 of four bitframes 612, 614, 616, and 618. The bitframes have pentagon-shaped value-indicators (622, 624, 626, and 628). These value-indicates include value-labels (b0, b1, b2, and b3). Each label represents the values of the bits inserted into a given bitframe. More specifically, the label represents the values ultimately encoded into a given bitframe of a signal. Such values may be a chip of a watermark alone or it may be the values of a chip of a watermark with a covert channel layered thereon.

In their original order, b0 is encoded into bitframe 612, b1 is encoded into bitframe 614, b2 is encoded into bitframe 616, and b3 is encoded into bitframe 618. Without permutation, the values of these bitframes are encoded and detected in the order of advancing time (from left to right on the graph). In this case, the order is "b0, b1, b2, b3."

The re-arrangement of the original order "b0, b1, b2, b3" is a permutation of the bitframes in the window 630. For example, the original order may be permuted into this order "b1, b2, b0, b3." In this example, b1 is encoded into bitframe 612, b2 is encoded into bitframe 614, b0 is encoded into bitframe 616, and b3 is encoded into bitframe 618.

The encoder bases its permutations upon a permutation table. This table may be precreated and stored at the encoder. This table may be pseudorandomly generated based upon a given key.

When the detector receives a signal with a permuted watermark, it uses the same permutation table (that the encoder used) to reverse permute the permuted watermark. Therefore, either the detector has the same table stored therein or it pseudorandomly generates it in the same manner and using the same key as the encoder.

Rather than re-order (i.e., permute) the entire audible spectrum (e.g., between $SubBand_{min}$ and $SubBand_{max}$), the exemplary watermarking with permutations only permutes selected subbands of frequencies within this spectrum. FIG. 6 shows four of such subbands 642, 644, 646, and 648.

The audible spectrum is divided into multiple frequency subbands. When permuting a bitframe, only selected subbands (such as subbands 642, 644, 646, and 648) are permuted. The other subbands (between and around subbands 642, 644, 646, and 648) in the spectrum are not permuted.

Since the permutation applies to only selected subbands in the spectrum, this permutation further hides the watermark data (with/without covert channel) within the signal. In effect, the permutation "mixes-up" the data to make a pattern even more difficult to detect. However, the watermark detector can locate the original signal, in part, because it has the permutation table.

The permutation of covert bits within selected subbands enables much better security and noise distribution. The covert message and the watermark are harder to find. The "noise" introduced by the covert message and the watermark is more evenly distributed; thereby, reducing the affect on the audio quality.

Figure 7:
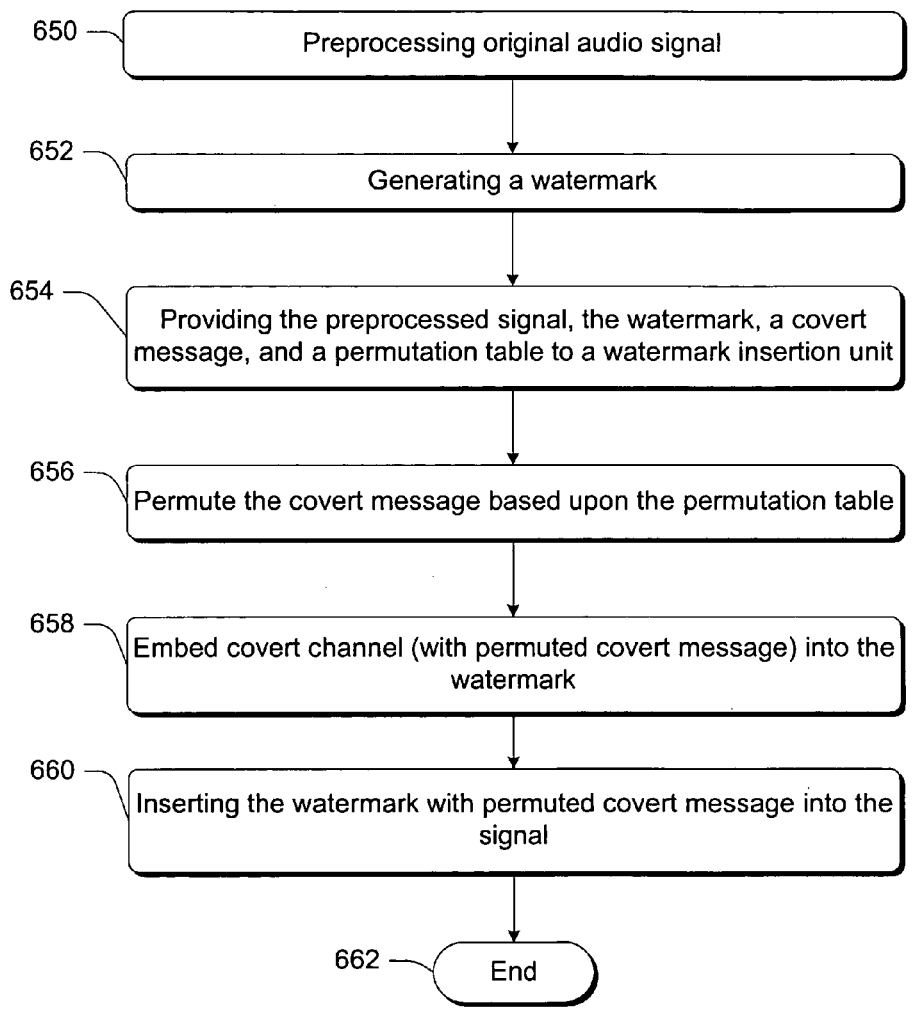
FIG. 7 is a flow diagram showing a methodological implementation of watermark encoding.

Methodological Implementation of Exemplary Watermark Encoding with Covert Channel and Permutations FIG. 7 shows a methodological implementation of the exemplary watermark encoding with covert channel and permutations. At 650, an original audio signal (such as from an audio clip) is preprocessed. One effective result of such preprocessing is to produce blocks and frames as described above.

Furthermore, such signal preprocessing is generally described above in reference to the watermark encoding system of FIG. 2. It is also described in more detail in co-pending patent application: U.S. patent application Ser. No. 09/316,899, entitled "Audio Watermarking with Dual Watermarks" filed on May 22, 1999.

At 652, the watermark encoder generates a watermark in accordance with the watermark generation described above and in the "Audio Watermarking with Dual Watermarks" co-pending application.

At 654, the blocks of the audio signal, the watermark, a covert message, and a permutation table are provided to a watermark insertion unit (such as unit 116 in FIG. 2). At 656, before the covert message is combined with the watermark, the covert message is permuted a window at a time. For example, a permutation subunit (such as PSU 124 in FIG. 2) uses a permutation table to determine how to reorder values in a window.

At 658 in FIG. 7, the covert channel is embedded into the watermark. For example, a covert message subunit (such as CMSU 122 of FIG. 2) imposes the covert message onto the watermark. Alternatively, first, the covet message may be imposed upon the watermark and second, a window of the watermark (with the covert channel) is permuted.

At 660, the resulting watermark is inserted into the audio signal. At 662, this process ends.

The following is an example of pseudocode that may be used to implement exemplary watermark encoding with covert channel and permutations:

```
BALANCING NOISE INDUCED BY THE CARRIER OF THE WATERMARK USING SECRET
    PERMUTATIONS OF MODULATED BITS OF THE COVERT COMMUNICATION
    CHANNEL
---------------------------------------------------------------------------------------------
INPUT=WATERMARK(SUBBANDS S, BITFRAMES B, FRAMES F),
    COVERT_CHANNEL_BITS B, {SECRET_KEY}
OUTPUT=SECRETLY PERMUTED WATERMARK spWATERMARK(SUBBANDS S, BITFRAMES
    B, FRAMES F)
---------------------------------------------------------------------------------------------
COVERT CHANNEL IS MODULATED INTO THE WATERMARK BY
FOREACH BITFRAME b in F
    newWATERMARK(SUBBANDS S, BITFRAME b, FRAMES F) =
    WATERMARK((SUBBANDS S, BITFRAME b, FRAMES F) xor
    COVERT_CHANNEL_BITS(BIT b)
ENDFOREACH
SECRETLY PERMUTED WATERMARK spWATERMARK(SUBBANDS S, BITFRAMES B,
    FRAMES F)
is created by permuting the bits of the modulated
    COVERT_CHANNEL_BITS for each subband separately.
FOREACH SUBBAND s in S
    spCOVERT_CHANNEL_BITS(B) = create secret permutation of bits of
    COVERT_CHANNEL_BITS(B)
    FOREACH BITFRAME b in F
        newWATERMARK(SUBBAND s, BITFRAME b, FRAMES F) =
    WATERMARK((SUBBAND s, BITFRAME b, FRAMES F) xor
    spCOVERT_CHANNEL_BITS(BIT b)
ENDFOREACH
=============================================================================
=============================================================================
```

Figure 8:
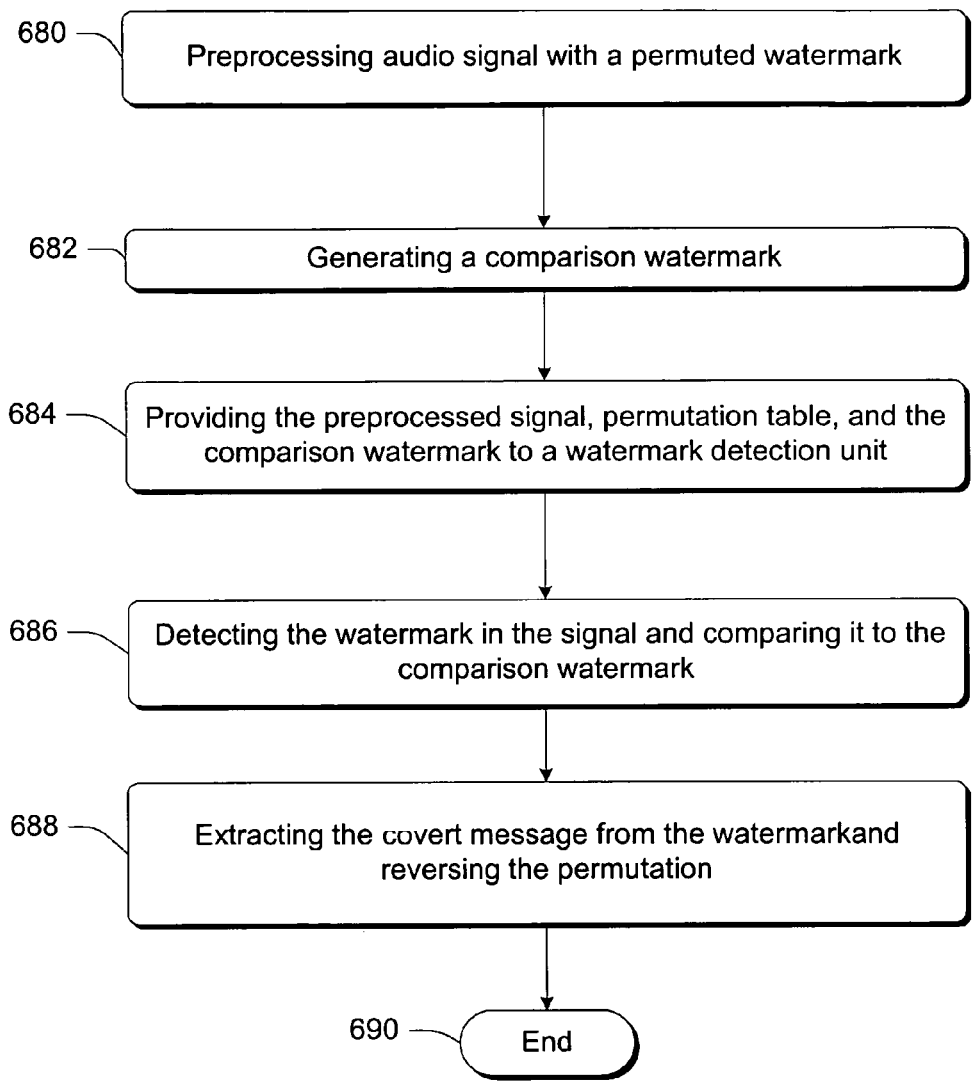
FIG. 8 is a flow diagram showing a methodological implementation of watermark decoding.

Methodological Implementation of Exemplary Watermark Detecting with Covert Channel and Permutations FIG. 8 shows a methodological implementation of the exemplary watermark detecting with covert channel and permutations. At 680, a watermarked audio signal (such as from an audio clip) is preprocessed. The watermark is permuted and includes a covert channel. The effective result of such preprocessing is to produce blocks and frames.

Furthermore, such signal preprocessing is generally described above in reference to the watermark detecting system of FIG. 3. It is also described in more detail in co-pending patent application: U.S. patent application Ser. No. 09/316,899, entitled "Audio Watermarking with Dual Watermarks" filed on May 22, 1999.

At 682, the watermark detector generates a comparison watermark in accordance with watermark generation described above and in the "Audio Watermarking with Dual Watermarks" co-pending application. This comparison watermark is generated using the same key as the original watermark. Therefore, they are identical.

At 684, the blocks of the audio signal, the comparison watermark, and the permutation table are provided to a watermark detector unit (such as unit 146 in FIG. 3). At 686, the watermark is detected from the audio signal and compared to the comparison watermark.

At 686 in FIG. 8, the permutation is reversed. For example, a permutation subunit (such as PSU 154 in FIG. 3) uses a permutation table to determine how to reverse the permutation values in a window and restore it to its original order. In addition, the covert message is extracted from the watermark. For example, a covert message subunit (such as CMSU 152 of FIG. 3) extracts (i.e., interprets) the covert message from the watermark.

At 690, this process ends. Typically, the detector will generate a result that indicates whether a watermark is present in the audio signal.

Exemplary Computing Environment

FIG. 9 illustrates an example of a suitable computing environment 920 on which the exemplary watermarking may be implemented.

Exemplary computing environment 920 is only one example of a suitable computing environment and is not intended to suggest any limitation as to the scope of use or functionality of the exemplary watermarking. Neither should the computing environment 920 be interpreted as having any dependency or requirement relating to any one or combination of components illustrated in the exemplary computing environment 920.

The exemplary watermarking is operational with numerous other general purpose or special purpose computing system environments or configurations. Examples of well known computing systems, environments, and/or configurations that may be suitable for use with the exemplary watermarking include, but are not limited to, personal computers, server computers, think clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary watermarking may be described in the general context of computer-executable instructions, such as program modules, being executed by a computer. Generally, program modules include routines, programs, objects, components, data structures, etc. that perform particular tasks or implement particular abstract data types. The exemplary watermarking may also be practiced in distributed computing environments where tasks are performed by remote processing devices that are linked through a communications network. In a distributed computing environment, program modules may be located in both local and remote computer storage media including memory storage devices.

As shown in FIG. 9, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 930 typically includes a variety of computer readable media. Such media may be any available media that is accessible by computer 930, and it includes both volatile and non-volatile media, removable and non-removable media.

In FIG. 9, the system memory includes computer readable media in the form of volatile, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 9 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 9 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 9, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 9 illustrates remote application programs 989 as residing on a memory device of remote computer 982. It will be appreciated that the network connections shown and described are exemplary and other means of establishing a communications link between the computers may be used.

Exemplary Operating Environment

FIG. 9 illustrates an example of a suitable operating environment 920 in which the exemplary watermarking may be implemented. Specifically, the exemplary watermarking is implemented by any program 960-962 or operating system 958 in FIG. 9.

The operating environment is only an example of a suitable operating environment and is not intended to suggest any limitation as to the scope of use of functionality of the exemplary watermarking described herein. Other well known computing systems, environments, and/or configurations that may be suitable for use with the exemplary watermarking include, but are not limited to, personal computers, server computers, hand-held or laptop devices, multiprocessor systems, microprocessor-based systems, programmable consumer electronics, wireless communications equipment, network PCs, minicomputers, mainframe computers, distributed computing environments that include any of the above systems or devices, and the like.

Computer-Executable Instructions

An implementation of the exemplary watermarking may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary watermarking may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the improved audio watermarking with covert channel and permutations has been described in language specific to structural features and/or methodological steps, it is to be understood that the improved audio watermarking with covert channel and permutations defined in the appended claims is not necessarily limited to the specific features or steps described. Rather, the specific features and steps are disclosed as preferred forms of implementing the claimed improved audio watermarking with covert channel and permutations.

The invention claimed is:

1. A method for concealing data within a digital audio signal, the method comprising:

receiving, at a computing device including a process executing a watermark encoding system, a first data pattern of discrete values which are bits of a watermark and a second data pattern of discrete values which are bits of a covert message;

imposing, at the computing device, a discrete value of the second data pattern over one or more discrete values of the first data pattern to generate a third data pattern, wherein the imposing is carried out by performing a Boolean operation with a discrete value of the second data pattern and multiple discrete values of the first data pattern;

processing the digital audio signal into a series of bitframes at the computing device, wherein each bitframe includes a set of frames, and wherein each frame includes a set of blocks; and encoding the third data pattern into the digital audio signal at the computing device, wherein a different bit of the watermark is encoded in each frame of at least one subject bitframe, and wherein a same bit of the covert message is encoded in each frame of the subject bitframe, wherein the same bit of the covert message is encoded in each frame of the subject bitframe at a different frequency with respect to each frame.

2. A method as recited in claim 1, wherein the Boolean operation is XOR.

3. A method as recited in claim 1, wherein a pattern of discrete values may be encoded into the digital audio signal in one of multiple discrete states, and wherein the imposing comprises encoding one or more multiple values of the first data pattern into the digital audio signal into a state that indicates a single discrete value of the second data pattern.

4. A method as recited in claim 3, wherein the multiple discrete states are positive or negative modifications to magnitudes of one or more subbands in a frequency spectrum of a sample of the digital audio signal.

5. A method as recited in claim 1, wherein the different bit of the watermark which is encoded in a respective frame of the subject bitframe, is repeated in each block of the respective frame.

6. A computer-readable storage medium having computer-executable instructions that, when executed by a computer, perform a method for concealing data within a digital signal, the method comprising:

receiving a first data pattern of discrete values which are bits of a watermark and a second data pattern of discrete values which are bits of a covert message;

imposing a discrete value of the second data pattern over one or more discrete values of the first data pattern to generate a third data pattern, wherein the imposing is carried out by performing a Boolean operation with a discrete value of the second data pattern and multiple discrete values of the first data pattern;

processing the digital signal into a series of bitframes, wherein each bitframe includes a set of frames, and wherein each frame includes a set of blocks; and encoding the third data pattern into the digital signal, wherein a different bit of the watermark is encoded in each frame of at least one subject bitframe, and wherein a same bit of the covert message is encoded in each frame of the subject bitframe, wherein the same bit of the covert message is encoded in each frame of the subject bitframe at a different frequency with respect to each frame.

7. The computer-readable storage medium as recited in claim 6, wherein the digital signal is selected from a group consisting of a digital audio signal, a digital video signal, a digital image signal, and a digital multimedia signal.

8. An apparatus comprising:
a processor;
a covert-channel-encoder executable on the processor to:
   receive a first data pattern of discrete values which are bits of a watermark and a second data pattern of discrete values which are bits of a covert message;
   impose a discrete value of the second data pattern over one or more discrete values of the first data pattern to generate a third data pattern, wherein the imposition is carried out by performing a Boolean operation with a discrete value of the second data pattern and multiple discrete values of the first data pattern;
   process a digital signal into a series of bitframes, wherein each bitframe includes a set of frames, and wherein each frame includes a set of blocks, and
   encode the third data pattern into the digital signal, wherein a different bit of the watermark is encoded in each frame of a plurality of bitframes of the digital signal, and wherein a same bit of the covert message is encoded in each frame of a respective bitframe, wherein the same bit of the covert message is encoded in each frame of the respective bitframe at a different frequency with respect to each frame.

9. The apparatus of claim 8, wherein the plurality of bitframes are arranged in a particular order.

10. The apparatus of claim 9, wherein the covert-channel encoder is executable on the processor to permute a respective set of values encoded in each of the plurality of bitframes such that the respective sets of values associated with the plurality of bitframes are arranged in a different order than the particular order of the plurality of bitframes.

11. The apparatus of claim 10, wherein the digital signal includes a digital audio signal, and wherein permuting the respective sets of values of the plurality of bitframes comprises permuting values of the respective sets of values that are included in one or more particular subbands of frequencies within an audible spectrum.

12. The apparatus of claim 8, wherein the third data pattern is encoded into the digital signal without increasing bandwidth necessary to carry the digital signal.

* * * * *